United States Patent [19]
Harris

[11] Patent Number: 5,746,114
[45] Date of Patent: May 5, 1998

[54] INTELLIGENT COOKING SYSTEM WITH WIRELESS CONTROL

[76] Inventor: David P. Harris, 1028 Walsh, SE., Grand Rapids, Mich. 49507

[21] Appl. No.: 698,550

[22] Filed: Aug. 15, 1996

Related U.S. Application Data

[60] Provisional application No. 60/002,330, Aug. 15, 1995.
[51] Int. Cl.$^6$ .................... A47J 27/62; F24C 7/08; H05B 1/02
[52] U.S. Cl. .................. 99/331; 99/325; 219/449; 219/452; 126/374
[58] Field of Search .................. 99/325, 331, 332, 99/333; 126/39 BA, 374, 39 H, 39 J; 219/448, 449, 450, 452, 464, 465

[56] References Cited

U.S. PATENT DOCUMENTS

| | | | |
|---|---|---|---|
| 3,592,180 | 7/1971 | Kweller et al. | 126/39 H |
| 5,611,264 | 3/1997 | Studer | 99/340 |

FOREIGN PATENT DOCUMENTS

| | | | |
|---|---|---|---|
| 2633482 | 12/1989 | France | 99/331 |
| 3026620 | 2/1982 | Germany | 99/331 |
| 3836099 | 5/1990 | Germany | 99/331 |
| 3237922 | 12/1991 | Japan | 99/331 |
| 2 277 145 | 10/1994 | United Kingdom . | |
| WO 94/24490 | 10/1994 | WIPO . | |

*Primary Examiner*—Reginald L. Alexander
*Attorney, Agent, or Firm*—Rader, Fishman, Grauer & McGarry

[57] ABSTRACT

An intelligent cooking system includes cooking implements such as saucepans, stockpots, etc., having a temperature sensor for sensing either the temperature of the cooking implement or any contents located therein. A plurality of heating surfaces each have a surface for supporting and transferring heat to the cooking implements. A temperature control knob for setting a desired cooking temperature and a timer control knob are also provided. A controller is operably connected to the temperature control knob, the timer control knob, the heating surface, and the temperature sensor via infrared for controlling the temperature of the heating surface based on temperature signals received from the sensor and the desired cooking temperature. Each of the cooking implements and each of the heating surfaces are distinguished by the controller so as to track the movement of any of the cooking implements between one or more of the heating surfaces. As a cooking implement is transferred from one heating surface to another, the desired temperature associated with the heating surface is transferred along with the cooking implement to control the new heating surface. When a desired cooking time interval is set, the remaining portion of the desired cooking time interval can be transferred along with the desired cooking temperature.

18 Claims, 5 Drawing Sheets

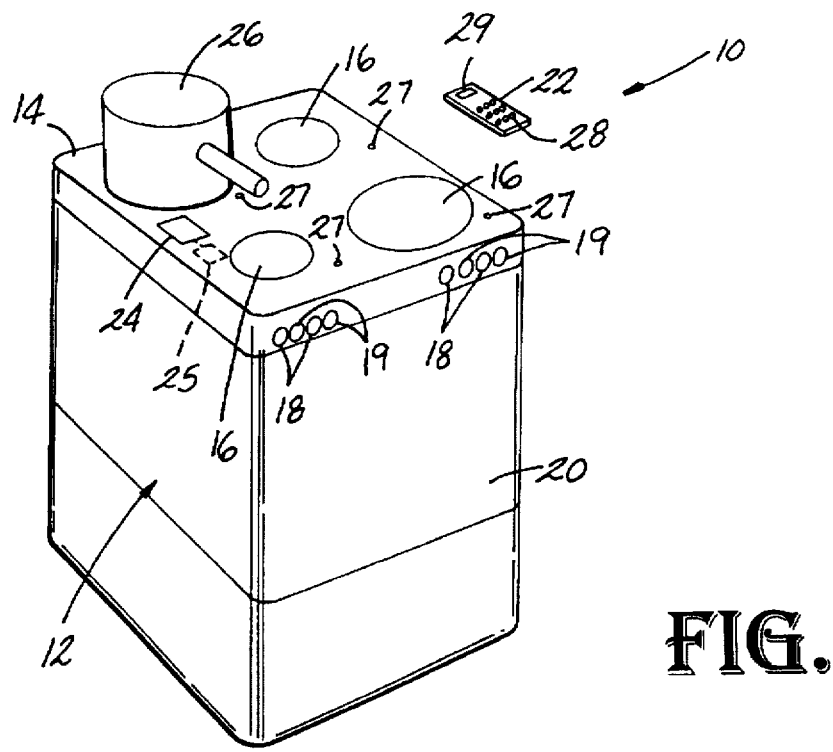
FIG. 1
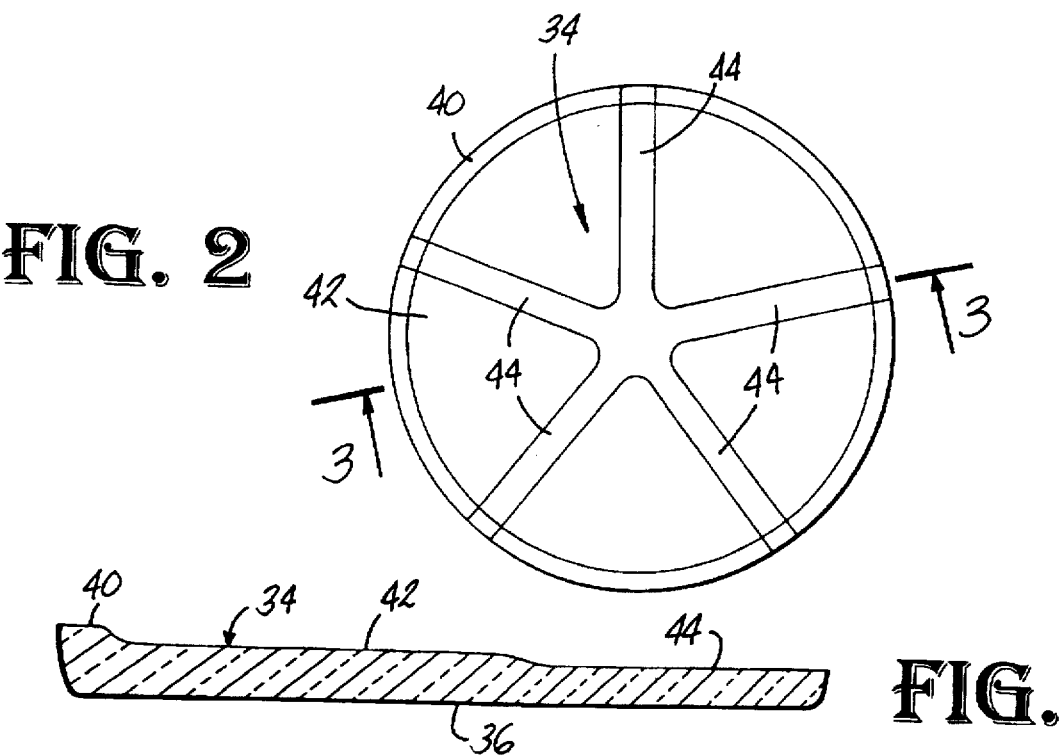
FIG. 2
FIG. 3

1

INTELLIGENT COOKING SYSTEM WITH WIRELESS CONTROL

This application claims the benefit of U.S. Provisional Application Serial No. 60/002,330 filed on Aug. 15, 1995.

BACKGROUND OF THE INVENTION

1. Field of the Invention

This invention relates to intelligent cooking systems, and more particularly to a system for recognizing and controlling the temperature of different cooking implements, such as saucepans, pots, etc., placed on and moved to different heating surfaces of a cooking range.

2. Description of the Related Art

Certain improvements in ceramic and glass technology have resulted in the creation of heating elements which, when combined with glass components, can be assembled to create a highly efficient and effective heat surface with a high degree of temperature feedback control. Some of this technology is described PCT Patent Application No. WO 94/24490 published Oct. 27, 1994. Before the development of this heating technology, it was very difficult to set and maintain a desired temperature for cooking implements during food processing due to the lack of direct temperature measurement of the heating surface itself for temperature control of the heating surface. However, even with the advent of this technology, it remains a challenge to measure and control the actual cooking temperature of food within cooking implements, especially when the implements are moved from one heating surface to another.

SUMMARY OF THE INVENTION

These and other problems of the prior art are overcome by the provision of an intelligent cooking system comprising a cooking implement having a temperature sensor, a heating surface for supporting and transferring heat to the cooking implement, and a device for setting a desired cooking temperature. A controller is operably connected to the temperature sensor, the temperature setting device, and the heating surface for controlling the temperature of the heating surface based on temperature signals received from the sensor and the desired cooking temperature.

In accordance with one aspect of the invention, a plurality of cooking implements with separate temperature sensors can be placed on any number of heating surfaces. The temperature signal from each sensor is preferably transmitted to the controller via wireless communication. Each heating surface preferably includes a proximity sensor to sense the presence or absence of at least one of the cooking implements on one or more of the heating surfaces.

According to a further aspect of the invention, the controller can distinguish between each of the cooking implements, preferably through wireless communication, and each of the proximity sensors such that the movement of any of the plurality of cooking implements between one or more of the heating surfaces can be tracked by the controller. This feature is particularly useful when a preset cooking program is associated with at least one of the cooking implements stationed on one of the heating surfaces. The preset cooking program is operably connected to the controller and follows the movement of the at least one cooking element from its present heating surface to a new heating surface to control the temperature of the new heating surface according to the preset program. A user may enter the parameters of the preset program through a keypad, such as desired cooking temperature and cooking time, or the parameters may be preset for common cooking techniques and foods. Preferably, a remote control is provided for displaying temperature and time information and for initiating or altering the preset program.

The heating surfaces are preferably constructed of a glass-ceramic material and include a plurality of radially extending contoured elements formed therein to give the appearance of a gas burner when heated.

A method for controlled cooking according to the invention includes placing one or a plurality of cooking implements on one or a plurality of heating surfaces, setting a desired cooking temperature for any contents in the cooking implement, and then measuring the temperature of at least one of the cooking implements and the contents. The temperature of each heating surface is controlled to maintain the desired temperature of each cooking implement or its contents.

According to a further feature of the invention, each of the cooking implements and each of the heating surfaces are distinguished so as to track the movement of any of the cooking implements between one or more of the heating surfaces. As a cooking implement is transferred from one heating surface to another, the desired temperature associated with the heating surface is transferred along with the cooking implement to control the new heating surface. A desired cooking time interval may also be set, and the remaining portion of the desired cooking time interval can be transferred along with the desired cooking temperature.

These and other objects, features, and advantages will be apparent from the ensuing description taken in conjunction with the accompanying drawings.

BRIEF DESCRIPTION OF THE DRAWINGS

The invention will now be described with reference to the drawings in which:

FIG. 1 is a perspective view of an intelligent cooking system according to the invention;

FIG. 2 is a top plan view of a heating surface according to the invention that forms part of the cooking system;

FIG. 3 is a cross-sectional view of the heating surface taken along line 3—3 of FIG. 2;

DETAILED DESCRIPTION OF THE PREFERRED EMBODIMENTS

Figure 4:
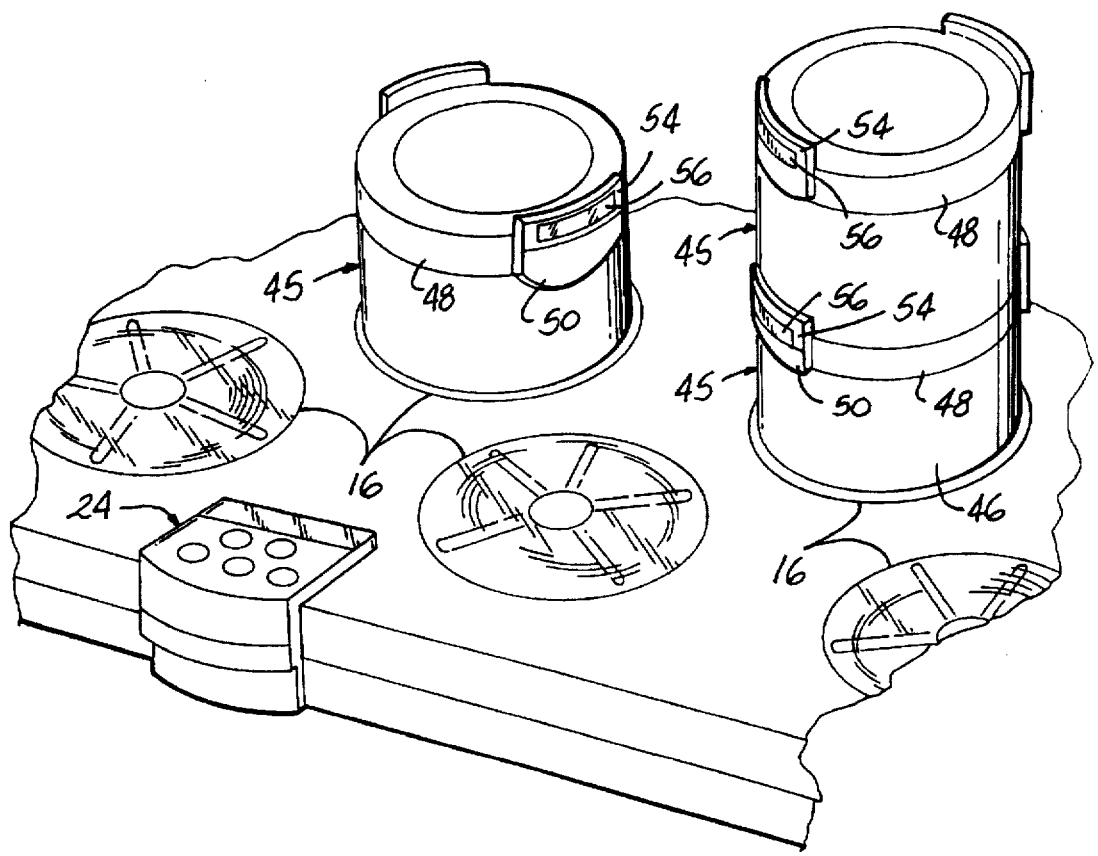
FIG. 4 is a perspective view of an intelligent cooking system according to a second embodiment of the invention and illustrating the details of cooking implements that form a part thereof.

Referring now to the drawings and to FIG. 1 in particular, an intelligent cooking system 10 according to the invention is shown. The cooking system 10 comprises a cooking workstation 12 having a range top or cooking surface 14 with a plurality of heating surfaces 16 located therein and temperature control knobs 18 for manually setting a desired cooking temperature of each heating surface 16. A timer control knob 19 may also be provided for controlling the on and off times of cooking operations for each heating surface 16. An oven unit 18 may also be incorporated into the intelligent cooking system.

A hand-held remote control 22 sends control signals to a local transceiver 24 which is hard-wired to a controller 25 (shown in dashed line) that is located in the range top 14. The controller 25 is of the conventional type having a microprocessor, memory, etc. The transceiver 24 is preferably positioned at a convenient location on the cooking surface 14 and receives real-time cooking information from an intelligent cooking implement and sends this information to the controller 25 for display and for manipulation of cooking parameters. The controller 25 also receives temperature feedback from each heating surface and can distinguish between each heating surface preferably through a hard wire connection. A cooking implement 26 is positioned on one of the heating surfaces 16 and may be of the conventional type or may interact with the range top and remote control as will be explained in greater detail below. A proximity detector 27 may be associated with each heating surface 16 and can be hard-wired to separate input ports of the microprocessor in the controller 25. The controller is thus able to distinguish between each proximity detector. Alternatively, each proximity detector may have a unique identity code associated therewith wherein the controller is programmed to recognize the codes and distinguish between each proximity detector. In this way, a single input port can be used for the plurality of proximity detectors. In any event, when a cooking implement is placed on one of the heating surfaces, the controller is immediately able to determine through the associated proximity detector the identity of a particular element on which the cooking implement is placed. The usefulness of this feature will be described in greater detail below. The proximity detector may be an electro-optical detector, strain gauge, mechanical probe, etc. In an alternate embodiment, the controller can be programmed to indicate the presence or absence of a cooking implement when a sudden decrease or increase in temperature is detected at the heating surface, which is indicative of a cooking element being placed on or removed from the heating surface.

In the event that each heating surface is associated with a hot plate (not shown) instead of or in addition to the range top 14, it is not practical for the separate hot plates to be hard-wired to the controller, since each hot plate can be moved independently. The proximity detectors and heating surfaces can communicate with the controller in this arrangement via wireless transceivers. Wireless communication is equally applicable when the controller is located at a distance from the stove top, e.g. in the remote control 22, in a computer, television, etc.

The remote control 22 preferably includes an LCD display 26 and a keypad 28. The information displayed on the remote control 22 preferably includes the internal cooking temperature of food contained in an interactive cooking implement 26, the heating surface cooking temperature (which is especially useful for conventional cooking implements), the amount of cooking time remaining for a particular cooking implement, and the particular cooking implement on a particular heating surface, etc. The keypad enables a user to initiate or modify the cooking temperature from a distance by turning on or off and raising or lowering the temperature of each heating surface 16 and also enables a user to enter or modify the cooking time or sequence associated with each heating surface or interactive cooking implement. The remote control and transceiver preferably communicate through infrared signals. However, other means of remote communication such as amplitude or frequency modulation, ultrasound, UHF, etc., can be employed. The remote control 22 is battery powered, while the transceiver 24 is preferably powered through converted AC line power connected to the cooking workstation 12.

The particular structure of the heating surfaces 16 is preferably similar to the structure disclosed in PCT patent application No. WO 94/24490, published Oct. 27, 1994, the subject matter of which is expressly incorporated herein by reference. The heating surface structure described in this patent is made of a glass-ceramic material such as lithium-alumino-silicate which is formed and heat treated. A radiant heating unit (not shown), such as a tungsten halogen lamp or inductive heating unit, is positioned below the glass-ceramic material. A temperature sensitive resistive element is formed on at least part of the glass-ceramic material to provide temperature feedback to a controller for precise temperature control of the heating surface.

Turning now to FIGS. 2 and 3, a modified form of the above-described heating surface 16 according to the present invention comprises a glass-ceramic disk 32 having an upper surface 34 that faces a cooking component and a lower surface 36 that faces a radiant heating unit (not shown) when installed in the range top 14. Preferably, the upper surface 34 is flush with an upper surface of the range top 14.

A ring-shaped planar surface 40 is formed adjacent to an outer peripheral edge of the disk 32. A portion 42 of the surface 34 is concave with the deepest point of the concave portion 42 being the center point of the surface 34. With this structure, a cookware unit can be supported entirely by the ring-shaped planar surface 40, and the heat supplied to the surface 34 in the concave portion 42 will be more focused and directed to the center of the cooking implement.

The upper surface 34 of the disk 32 also includes a contoured surface intended to mimic the look of a gas cooking stove, preferably in the form of a plurality of radially extending grooves 44 that form a star shape. The radiant heat source is readily visible in the star-shaped radial grooves 44 to give the appearance of a gas-fired burner and allows the user to readily ascertain if the radiant heat source is active. Although the radially extending grooves 44 are shown as being formed in the upper heat surface 34, they may alternatively be formed in the lower surface 36.

Figure 5:
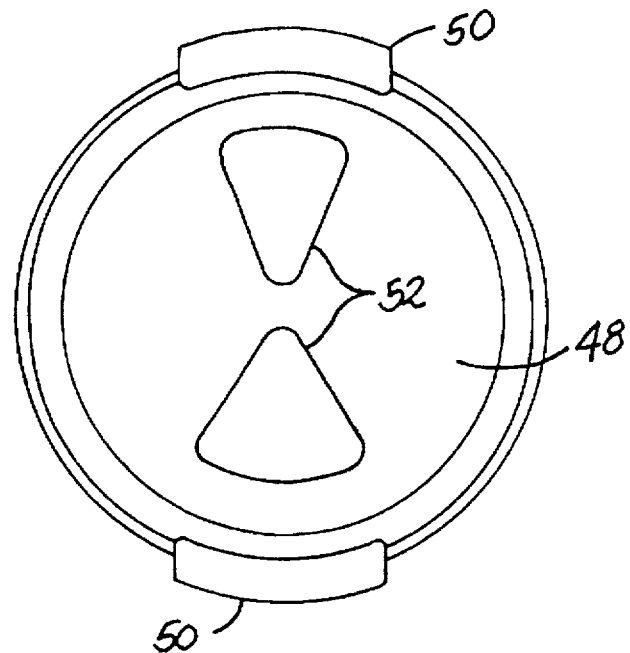
FIG. 5 is a top plan view of a cooking implement according to the invention.
Figure 6:
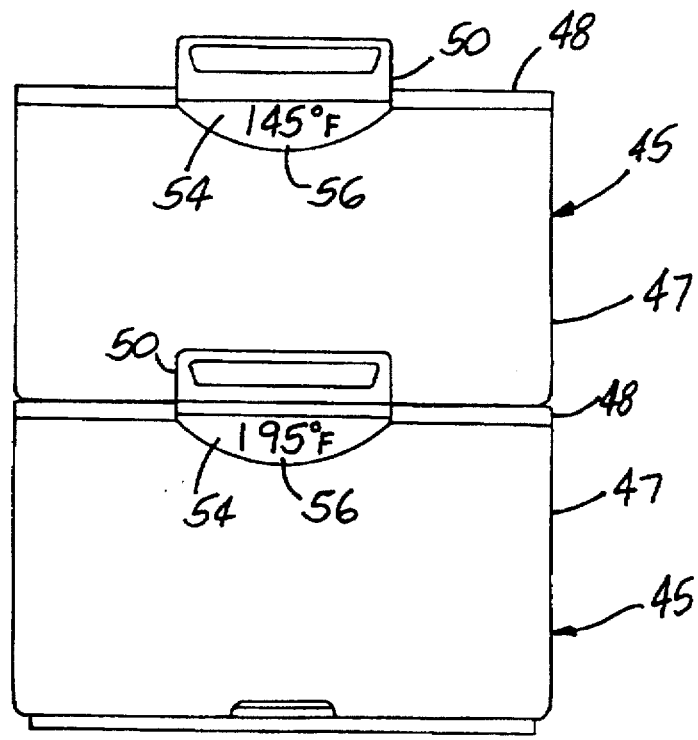
FIG. 6 is a side elevational view of a pair of cooking implements stacked one upon another.

With reference now to FIGS. 4–6, the intelligent cooking system 10, according to an alternative arrangement, includes a plurality of heating surfaces 16 arranged flush with the range top 14 in a staggered relationship. An interactive or intelligent cooking implement 45, according to an exemplary embodiment, comprises a pot 47 and a lid 48 having a pair of combination latch/handles 50 integrally formed therein. The lid 48 also has multiple steam vents 52 formed therein which may be selectively opened or closed. A transceiver module 54 having a memory, battery, temperature sensor (not shown) and a temperature display section 56 is provided on the lid 48 for collecting and displaying the internal cooking temperature of the contents of the pot 47.

Figure 7:
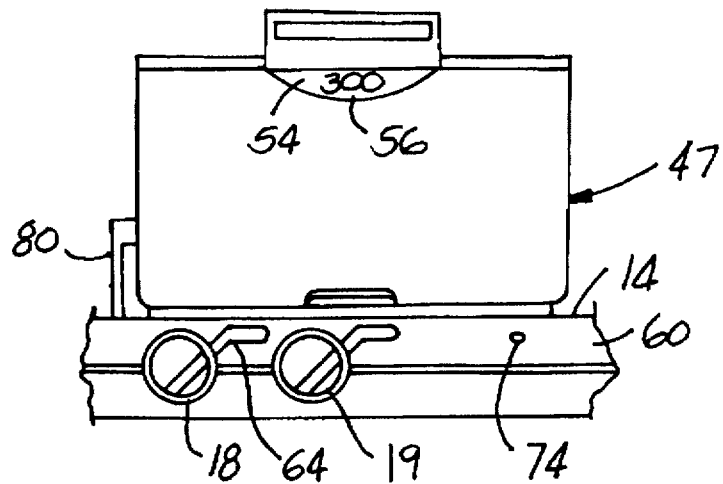
FIG. 7 is a front elevational view of a portion of a range top and cooking implement electrically interconnected for display and control of the cooking implement internal cooking temperature.

Alternatively, the transceiver module 54 and display section 56 can be provided at a convenient location on the pot 47 rather than the lid 48, as shown in FIG. 7. The temperature sensor is preferably formed integrally with the cooking implement and may be of the thermistor or resistive type.

The temperature of the cooking implement at this position is reflective of the cooking temperature of the contents inside the cooking implement, since the temperature of the walls of the cooking implement will not rise significantly above the temperature of its contents. With this structure, the cooking conditions inside the cooking implement can be easily monitored and controlled to maintain the ideal cooking conditions of the contents inside the cooking implement. Although the transceiver module 54 has been associated with a particular cooking implement structure, it is to be understood that the module 54 can form part of other cooking implements such as sauce pans, stock pots, etc. The transceiver module 54 may alternatively be manufactured as a stand-alone unit that is readily attachable to a conventional or passive cooking implement, or may be formed as part of a stirring spoon or other utensil that can be placed directly into the food.

The transceiver module 54 is preferably linked via infrared or other signal types to the transceiver 24 and relays cooking implement identification and temperature information to the transceiver 24. The transceiver module 54 of each cooking implement preferably includes a memory that can be preprogrammed with a unique identification code that is transmitted along with the temperature information to the transceiver 24. Alternatively, the module 54 may be assigned an identification code that is stored in the module memory in response to polling from the range top controller 25. The transceiver module 54 and display 56 can be turned on manually through a well-known on/off switch (not shown). However, it is preferred that the module 54 and display 56 are automatically activated through the cooking implement temperature sensor and a switch (not shown) when the temperature of the cooking implement or contents thereof reaches a predetermined lower temperature threshold, which should be above ambient. Likewise, the module and display are deactivated when the temperature of the cooking implement or any contents therein cools below the lower temperature threshold.

Figure 8:
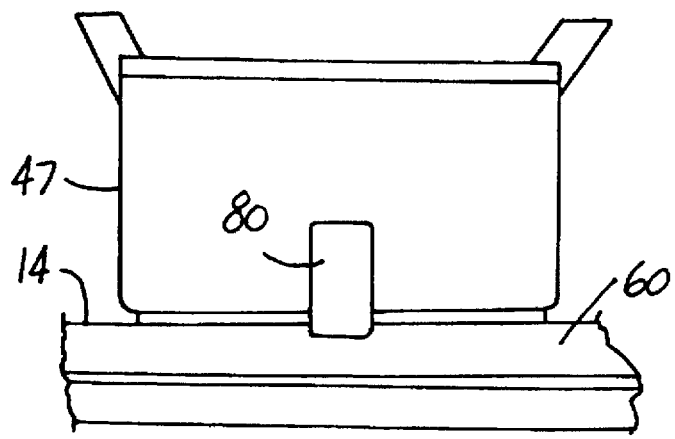
FIG. 8 is a side elevational view of a portion of a range top and cooking implement of FIG. 7.

FIGS. 7 and 8 show an alternative embodiment of the interconnection between the cooking implement 45 and the range top 14. In this embodiment, an arm 70 extends upwardly from the range top to contact the side wall of the cooking implement 45. A temperature sensor (not shown) is provided at the upper end of the arm 70 which measures the temperature of the cooking implement 45 a spaced distance from the bottom surface of the implement 45. Again, the temperature of the cooking implement at this point is reflective of the cooking temperature of the contents inside the cooking implement. The controller can utilize this data to automatically alter the temperature of the cooking surface 62 so that greater control over the precise cooking conditions is achieved.

Figure 9:
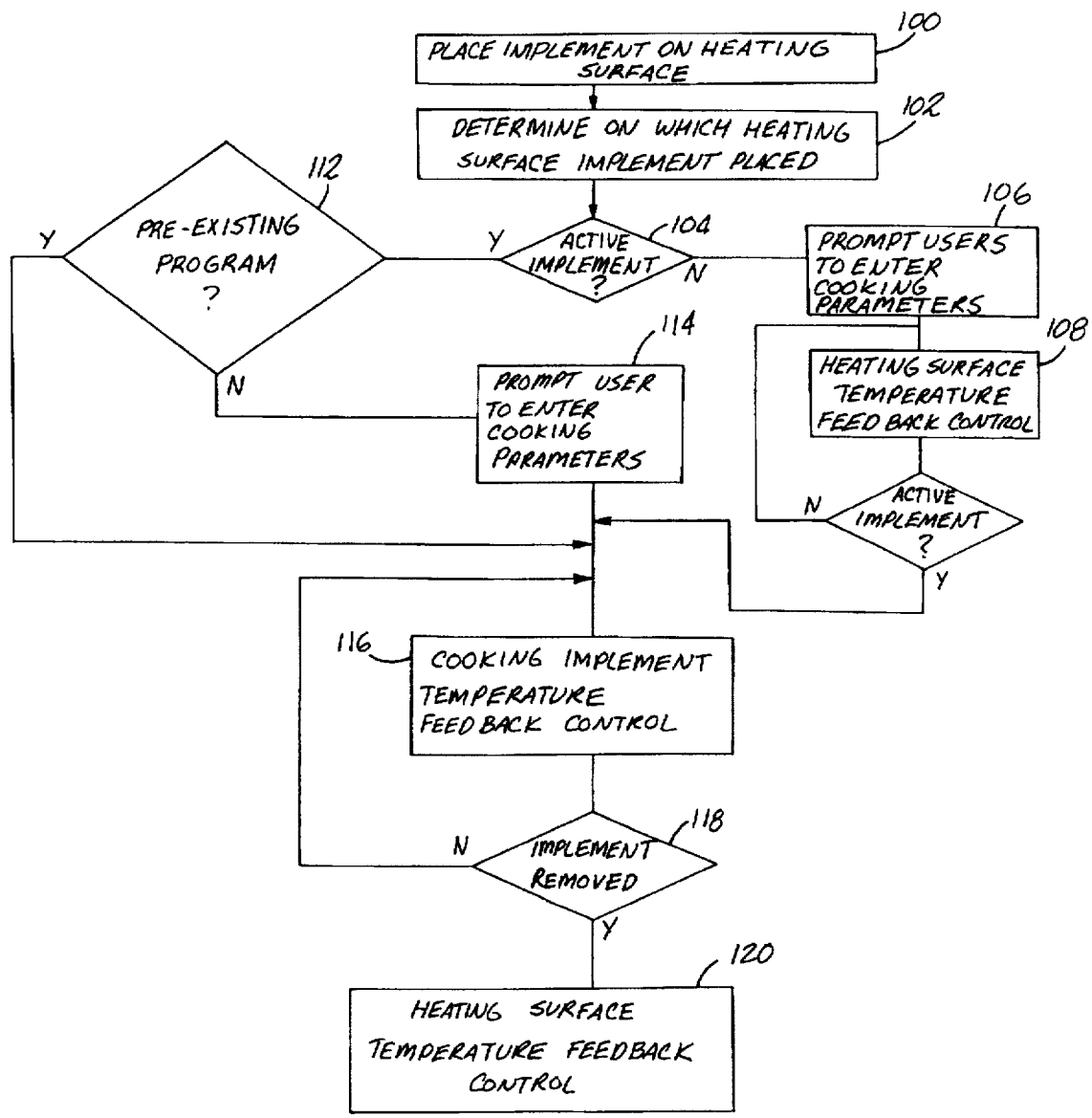
FIG. 9 is a block diagram illustrating the function of the intelligent cooking system.

With reference now to FIG. 9, operation of the intelligent cooking system will now be described. It is common to place a saucepan on an easily accessible front heating surface for adding and mixing ingredients during an initial cooking stage and then transferring the saucepan to a rear burner during a final cooking stage. The intelligent cooking system according to the invention is able to track movement of the saucepan from one heating surface to another within a predefined time interval while maintaining the originally entered cooking parameters. An intelligent or passive cooking implement is placed on one of the heating surfaces 16, as represented by block 100. The associated proximity device 27 detects the presence of the cooking implement and signals the controller 25. Since each proximity device is associated with a different input port of the microprocessor, the controller can immediately ascertain which heating surface the cooking implement has been placed on, as represented by block 102. Once ascertained, the controller 25 polls the cooking implement via the range top transceiver 24 and the implement transceiver module 54 to determine if the cooking implement is passive or intelligent, as represented by block 104. If no response is received from the cooking implement, the controller concludes that the cooking implement is passive. The user is then prompted to enter the cooking parameters, such as temperature and cooking time, in block 106 either through manipulation of the associated control knobs 18 and 19 or the remote control 22. The range top and/or remote control may be provided with a menu bar (not shown) having several program buttons for cooking or warming particular food types in a preprogrammed sequence. For example, certain sauces initially require a high cooking temperature for a certain time interval and then a lower simmering temperature for a second time interval to thicken the sauce. A single button on the menu bar can therefore be programmed for sauces. Other buttons may be preprogrammed or programmable by a user for different food types or cooking procedures or recipes. In block 108, the temperature of the heating surface 16 is then directly controlled by the controller 25 through a temperature feedback loop in accordance with the parameters entered or program selected. In the preferred embodiment, the module 54 is activated through the temperature sensor and a switch responsive thereto when the temperature of the cooking implement is equal to or greater than a predetermined lower threshold temperature. After a predetermined time delay, the cooking implement is again polled by the controller 25 in block 110 to determine whether the implement is passive or intelligent. Alternatively, the intelligent implement may automatically send a signal to the controller 25 after passing through the predetermined lower threshold temperature. In any event, if no signal is received from the implement after the predetermined time delay, the controller 25 again concludes that the implement is passive and the controller continues to regulate the temperature of the heating surface through heating surface temperature feedback. If the controller receives a signal from the implement, the controller concludes that the implement is intelligent. The heating surface is then controlled at block 116 in response to implement or food temperature signals received in the controller from the implement via the implement transceiver module 54 and the controller transceiver 24 and in accordance with the cooking parameters previously entered in block 106.

If in block 104 the controller concludes that an active implement is present on the heating surface, the controller 25 then determines if the implement was previously associated with another heating surface, as represented by block 112. If this determination is negative, the user is prompted to enter cooking parameters in block 114, in the same manner as in block 106 described above. The heating surface is then controlled at block 116 in response to implement or food temperature signals received in the controller from the implement via the implement transceiver module 54 and the controller transceiver 24 and in accordance with the cooking parameters previously entered in block 114.

If in block 112 it is determined that the implement was associated with a previous heating surface 16 within a predetermined time interval, the cooking parameters associated with the previous heating surface are transferred to the present heating surface. The present heating surface is then controlled at block 116 in accordance with the cooking parameters entered for the previous heating surface. For example, it is common to place a saucepan on an easily accessible front heating surface for adding and mixing ingredients during an initial cooking stage and then transferring the saucepan to a rear burner during a final cooking stage. The intelligent cooking system according to the invention is able to track movement of the saucepan from one heating surface to another within a predefined time interval while maintaining the originally entered cooking parameters. This control procedure also applies when the saucepan is temporarily removed and then returned to the same heating surface.

In block 118, the controller detects removal of the cooking implement from the heating surface via the associated proximity sensor 27 and/or the detection of a predetermined temperature drop or absence of a temperature signal from the cooking implement. If one or all of these conditions are met, the controller 25 determines that the cooking implement has been removed from the present heating surface, whether the implement is transferred to another heating surface or removed from the cooking workstation 12. If the implement has not been removed, the control in block 116 remains uninterrupted. If, however, the implement is removed, control of the heating surface is based on temperature feedback from the heating surface instead of temperature feedback from the cooking implement or food, as represented at block 120.

When a plurality of cooking implements are simultaneously used, the controller polls each cooking implement with its associated identification code to obtain implement or food temperature data. Alternatively, each implement may transmit the current temperature along with its identification code at set time intervals. The time intervals may be in fractions of a second, seconds, minutes, etc. In this alternative approach, a multiplexer may be provided to separate the simultaneous transmission of multiple cooking implement information.

For the FIGS. 7 and 8 embodiment, the above-described procedure is the same with the exception that the polling identification code and temperature signals are transmitted and received via hard wire.

In a simpler arrangement, the proximity sensors may be eliminated. In this embodiment, tracking of the intelligent cooking implements can still occur. The above-described procedure may be followed, with the exception that the user first manually turns on the heating surface with a particular program through the dials 18 and 19 or through a menu bar. An intelligent cooking implement is then placed on the heating surface. The controller polls the cooking implement and assigns an identity thereto. The controller then associates the selected program with the cooking implement and stores this information. In the event that another heating surface is turned on and the cooking implement is transferred to that surface, the controller recognizes the transfer by virtue of the cooking implement temperature or food temperature. For example, if a certain cooking temperature was originally selected for the intelligent cooking implement and the implement was then transferred to another heating surface, the controller would recognize that the cooking temperature has increased or dropped, and would adjust the heating surface accordingly.

The combination intelligent cooking system according to the invention is readily adaptable for a variety of modifications. The number of cooking surfaces and the placement of the cooking surfaces can be altered, as shown in FIGS. 1 and 4, depending on the structural requirements of the kitchen area or the functional requirements desired by the user. The temperature sensors and controllers utilized in the cooking implements according to the invention provide enhanced control over the cooking process. For example, if the user repetitively boils water, the controller can be programmed to quickly bring the water inside the cooking implement to the boiling point and then reduce the temperature to the point necessary to maintain this boiling state. The controller can also be programmed to reduce the temperature after the addition of food, such as pasta, to the boiling water. The controller can also be programmed to turn off the heating surface after a desired heating cycle thereby preventing overcooking of the food in the cooking implement. The programmability of the several cooking surfaces is limited only by the creativity of the user.

Although the controller 25 has been described as having a microprocessor and other peripheries, a much simpler controller can be used where the complexity of the system desired is rather low. Thus, the controller 25 may be a simple circuit that interfaces between the temperature sensor associated with the cooking implement, the temperature control knob 18, and the heating surface 16 for regulating or controlling the temperature of the cooking implement and/or any contents located therein.

Reasonable variation and modification are possible within the spirit of the foregoing specification and drawings without departing from the scope of the invention as defined by the appended claims.

The embodiments for which an exclusive property or privilege is claimed are defined as follows:

1. An intelligent food cooking system comprising:
    at least one cooking implement having a temperature sensor;
    a plurality of heating surfaces for supporting and transferring heat to the cooking implement;
    a proximity sensor associated with each heating surface;
    a device for setting a desired cooking temperature; and
    controller means operably connected to the temperature sensor, each temperature setting device, each proximity sensor, and each heating surface for controlling the temperature of each heating surface based on temperature signals received from the sensor and the desired cooking temperature and on the presence or absence of the at least one cooking implement on one or more of the heating surfaces as sensed by the proximity sensors.

2. An intelligent food cooking system according to claim 1 wherein the at least one cooking implement comprises a plurality of cooking implements, each cooking implement having a separate temperature sensor.

3. An intelligent food cooking system according to claim 1 wherein the controller includes means for distinguishing between each of the cooking implements and means for distinguishing between each of the proximity sensors such that the movement of any of the plurality of cooking implements between one or more of the heating surfaces can be tracked by the controller.

4. An intelligent food cooking system according to claim 3 and further comprising a preset cooking program associated with at least one of the cooking implements stationed on one of the heating surfaces, the preset cooking program being operably connected to the controller, so that the preset program follows the movement of the at least one cooking element to another of the heating surfaces.

5. An intelligent food cooking system according to claim 4 wherein the preset cooking program includes a timer setting for activating or deactivating the associated heating surface after a desired time period.

6. An intelligent food cooking system according to claim 5 wherein the preset program includes two different temperature settings for the desired time period.

7. An intelligent food cooking system according to claim 1 and further comprising a preset cooking program associated with at least one of the cooking implements stationed on one of the heating surfaces, the preset cooking program being operably connected to the controller, such that the preset program follows the movement of the at least one cooking element to another of the heating surfaces.

8. An intelligent food cooking system according to claim 4 and further comprising a remote control for entering the preset program.

9. An intelligent food cooking system according to claim 1 wherein the device for setting a desired cooking temperature comprises a remote control.

10. An intelligent food cooking system according to claim 1 wherein each of the plurality of heating surfaces comprises a glass-ceramic insert.

11. An intelligent food cooking system according to claim 10 wherein the glass-ceramic insert includes a plurality of radially extending grooves formed in the top surface thereof.

12. An intelligent food cooking system according to claim 1 wherein the controller includes a receiver and the temperature sensor includes a transmitter for sending signals indicative of current temperature to the receiver.

13. A method for controlled cooking of food comprising:
providing a plurality of heating surfaces;
placing at least one cooking implement on one of the plurality of heating surfaces;
setting a desired cooking temperature for any contents in the cooking implement;
measuring the temperature of at least one of the cooking implement and the contents;
controlling the temperature of the one heating surface to maintain the desired temperature;
moving the cooking implement from the one heating surface to a second heating surface of the plurality of heating surfaces;
tracking the movement of the implement from the one heating surface to the second heating surface; and
controlling the temperature of the second heating surface to maintain the desired temperature.

14. A method according to claim 13 wherein the step of providing at least one cooking implement includes providing a plurality of cooking implements;
and further comprising the steps of distinguishing between each of the cooking implements and distinguishing between each of the heating surfaces to track the movement of any of the plurality of cooking implements between one or more of the heating surfaces.

15. A method according to claim 13 and further comprising the step of setting a desired cooking time interval and wherein the step of transferring includes transferring at least a remaining portion of the desired cooking time interval.

16. A method according to claim 13 wherein the step of providing the plurality of heating surfaces includes providing a glass ceramic insert for each of the heating surfaces.

17. A method according to claim 16 wherein each glass-ceramic insert includes a plurality of radially extending grooves formed in the top surface thereof.

18. A method for controlled cooking of food comprising:
providing a plurality of heating surfaces;
placing a plurality of cooking implements on the plurality of heating surfaces;
setting one or more desired cooking temperatures for any contents in each of the cooking implements;
measuring one of the temperature of each of the cooking implements and the temperature of the contents in each of the cooking implements;
controlling the temperature of the heating surfaces to maintain the desired temperatures;
distinguishing between each of the cooking implements; and
distinguishing between each of the heating surfaces to track movement of any of the plurality of cooking implements between one or more of the heating surfaces.

* * * * *